(12) United States Patent
Mottay

(10) Patent No.: US 7,110,111 B2
(45) Date of Patent: Sep. 19, 2006

(54) CONTROLLED WIDE SPECTRUM COMPACT ULTRABRIEF LASER SOURCE

(75) Inventor: Eric Mottay, Begles (FR)

(73) Assignee: Amplitude Systemes, Talence (FR)

( * ) Notice: Subject to any disclaimer, the term of this patent is extended or adjusted under 35 U.S.C. 154(b) by 0 days.

(21) Appl. No.: 10/484,886

(22) PCT Filed: Jul. 27, 2002

(86) PCT No.: PCT/FR02/02697

§ 371 (c)(1),
(2), (4) Date: Sep. 21, 2004

(87) PCT Pub. No.: WO03/012545

PCT Pub. Date: Feb. 13, 2003

(65) Prior Publication Data

US 2005/0024635 A1  Feb. 3, 2005

(30) Foreign Application Priority Data

Jul. 27, 2001  (FR) .................................. 01 10134

(51) Int. Cl.
*G01J 3/30* (2006.01)
(52) U.S. Cl. .................................. 356/318
(58) Field of Classification Search .................. 372/30, 372/64, 101, 108, 39, 20–23; 385/31–37, 385/147, 122, 123, 125; 359/326–332
See application file for complete search history.

(56) References Cited

U.S. PATENT DOCUMENTS

| 6,097,870 | A | * | 8/2000 | Ranka et al. ................ 385/127 |
| 6,178,041 | B1 | | 1/2001 | Simon |
| 6,236,779 | B1 | * | 5/2001 | Kafka et al. ................. 385/31 |
| 6,611,643 | B1 | * | 8/2003 | Birk et al. .................... 385/33 |
| 2002/0006264 | A1 | * | 1/2002 | Birk et al. .................. 385/147 |

* cited by examiner

*Primary Examiner*—Gregory J. Toatley, Jr.
*Assistant Examiner*—Isiaka O. Akanbi
(74) *Attorney, Agent, or Firm*—Young & Thompson

(57) ABSTRACT

A wide-spectrum compact ultrabrief laser source includes a rare-earth ion primary laser. The source is pumped by a pump light flux centered on a wavelength $\lambda_D$, the flux being emitted by a solid laser pump source. The primary source emits a primary light flux centered on a wavelength $\lambda_L$ of spectral width $\Delta\lambda_L$. The latter is injected via an optical injection into a photonic crystal fiber having a length L, a cross-section d, and a set of cavities of diameter $\phi$. A coupling optics collects the light flux at the output of the photonic crystal fiber. The light flux is centered on a wavelength $\lambda_F$ and has a spectral width $\Delta\lambda_F$. The spectrum is subjected in the photonic crystal fiber to an enlargement which is due for more than 50% to phase self-modulation.

16 Claims, 3 Drawing Sheets

CONTROLLED WIDE SPECTRUM COMPACT ULTRABRIEF LASER SOURCE

This invention concerns a controlled wide spectrum ultrashort compact laser source.

Since the realisation by Ippen and Shank in 1974 [Appl. Phys. Letters; 24, (1974) 373] of the first laser emitting pulses shorter than the picosecond (1 ps=$10^{-12}$ s), the duration of laser pulses has been reduced further and further. Lasers generating pulses whereof the duration is smaller than the picosecond are designated as "Ultrashort lasers". They attract strong interest and intense research endeavours in the scientific community because the ultrashort pulses generated enable temporal study of the dynamics of ultrarapid processes (smaller than $10^{10}$ s) inaccessible until now for most detectors. With these ultrashort light sources, new fields of investigations and applications appear, as in the process of fragmentation and/or desorption of multiphotonic adsorbed molecules, metrology, non-destructive studies of chemical mechanisms in biological cells, etc.

The generation of wide spectral band ultrashort optical signals has become a routine. Lasers using as an amplifying medium a titanium-doped sapphire crystal ($Ti^{+3}:Al_2O_3$) and available commercially generate pulses having a duration close to 10 fs (1 fs=$10^{-15}$ s) which corresponds to a spectral width of the order of 100 THz (1 THz=$10^{12}$ Hz). These pulses are vastly tunable by modifying or adjusting the laser resonator. However, the operation of lasers using the titanium-doped sapphire requires an independent pump laser source. This source is generally an ionic laser (Argon) or an Nd:YAG laser pumped by diodes and frequency-doubled. This independent pump laser source is rather detrimental to the space requirements of the laser system and the reliability of the equipment. Moreover, this source makes the total cost of an ultrashort laser system relatively high.

Besides, lasers generating ultrashort pulses involving amplifying media with rare earth ions (Ytterbium (Yb), Neodymium (Nd), . . . ) are known. Such lasers may advantageously be pumped directly by a junction laser. They show, therefore, very attractive characteristics since they are compact, reliable and cheap. However, the fluorescence width of such laser media limits strongly the spectrum of the pulse emitted and consequently the spectral range over which the laser is tunable. Typically, for a Yb:YAG laser, the fluorescence width is 6 nm (1 nm=$10^{-9}$ m), the spectral width is approximately 3 nm and it is not easily tunable. These figures should be compared with those of the laser using the titanium-doped sapphire which has a fluorescence width of 200 nm, a spectral width greater than 100 nm and a tunability range between 750 and 950 nm.

In the U.S. Pat. No. 6,097,870, Ranka and al. have shown the possibility of realising the spectral widening of a pulsed luminous flux by implementing a fibre with photonic crystals. The pulses injected into said fibre, 75 cm long, are generated by a laser source and are defined by a peak power greater than a few hundred watts. Thus, by being coupled in a fibre with photonic crystals, the generated spectrum is as wide as possible and the mechanisms responsible for this widening are the phase self-modulation, the stimulated Raman emission, the parametric amplification, the 4-wave mixture and the creation of an optical shock wave. Still, these physical mechanisms are not all understood and the widening of the spectrum is not controllable, as regards its amplitude as well as its spectral width. Consequently, it is not possible to optimise the widening conditions of said spectrum in order to select, using a filter, a particular pass-band having a maximised intensity.

The purpose of this invention is to provide an ultrashort laser source simple in its design and in its operating mode, compact, cheap and enabling to obtain pulses with controlled wide spectrum, in width as well as in their intensity-related spectral distribution.

To this end, the invention concerns a wide spectrum ultrashort laser source including:
- a laser primary source with rare earth ions receiving a luminous pump flux centred on a wavelength $\lambda_D$, said flux being emitted by a solid laser pump source, said primary source including an active material and emitting a primary luminous flux centred on a wavelength $\lambda_L$ of spectral width $\Delta\lambda_L$.
- a photonic crystal fibre having a length L, a section d, and a set of cavities of diameter $\phi$,
- injection optics sending the primary luminous flux emitted by the primary source into the fibre with photonic crystals,
- coupling optics collecting the luminous flux at the output of the fibre with photonic crystals, said flux being centred on a wavelength $\lambda_F$ and of spectral width $\Delta\lambda_F$.

According to the invention, the spectrum is subjected inside the photonic crystal fibre to a widening of more than 50% of the phase self-modulation.

In different possible embodiments, this invention also concerns the characteristics which will appear during the following description and which should be considered individually or in all their technically possible combinations:
- the contribution to the widening of the spectrum of the phase self-modulation is preferably greater than 80%,
- the length L of the photonic crystal fibre is $5 \leq L \leq 40$ cm and the power density of the incident primary luminous flux is smaller than 600 Gigawatts/cm$^2$,
- it includes a wavelength selection device,
- the wavelength selection device comprises a grid of interferential filters,
- said flux of spectral width $\Delta\lambda_F$ exhibits amplitude modulations of average period $\tau$ and the pass-band of each filter is adapted to this average period $\tau$,
- the solid laser pump source is a function laser,
- the active material comprises ytterbiuim ions,
- the active material comprises neodymium ions,
- the spectral width $\Delta\lambda_F$ ranges between 10 and 400 nm,
- the diameter $\phi$ of the cavities, the length L and the section d of the fibre with photonic crystals, the spacing between the cavities are selected so that the dispersion of the primary luminous flux centred on the wavelength $\lambda_L$ in said photonic crystal fibre is in absolute value smaller than the dispersion of a homogeneous optic fibre of the same material and of length L for the wavelength $\lambda_L$,
- the dispersion of the primary luminous flux centred on the wavelength $\lambda_L$ in the photonic crystal fibre is nil.

The invention also concerns a sample measuring device using multiphotonic confocal microscopy comprising:
- a confocal microscope including a lens,
- a light source emitting a luminous flux,
- means capable of directing said luminous flux to a sample through the microscope,
- means for detecting the intensity of the luminous flux produced by the interaction of the luminous beam emitted by the light source on the sample and collected by the microscope,
- means for processing the signal produced by the means of detection.

According to the invention, the light source comprises:
- a laser primary source with rare earth ions receiving a luminous pump flux centred on a wavelength $\lambda_D$, said flux being emitted by a solid laser pump source, said primary source including an active material and emitting a primary luminous flux centred on a wavelength $\lambda_L$ of spectral width $\Delta\lambda_L$,
- a photonic crystal fibre having a length L, a section d, and a set of cavities of diameter $\phi$,
- injection optics sending the primary luminous flux emitted by the primary source into the fibre with photonic crystals,
- coupling optics collecting the luminous flux at the output of the fibre with photonic crystals, said flux being centred on a wavelength $\lambda_F$ and of spectral width $\Delta\lambda_F$.

In different possible embodiments, this invention also concerns the characteristics which will appear during the following description and which should be considered individually or in all their technically possible combinations:
- the spectrum is subjected inside the photonic crystal fibre to a widening of more than 50% of the phase self-modulation.
- the contribution to the widening of the spectrum of the phase self-modulation is preferably greater than 80%,
- the length L of the photonic crystal fibre is $5 \leq L \leq 40$ cm and the power density of the incident primary luminous flux is smaller than 600 Gigawatts/cm².

The invention will be described more in detail with reference to the appended drawings whereon:

Figure 1:
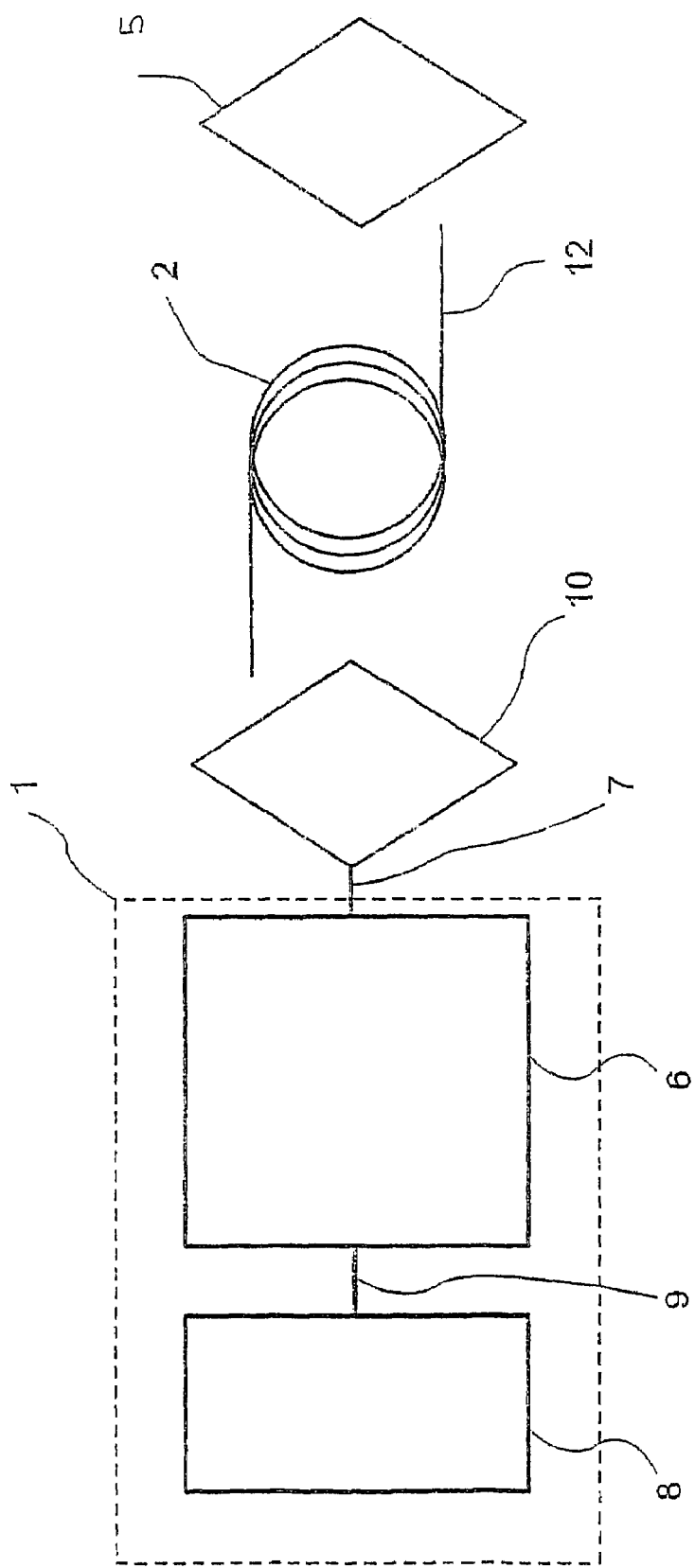
FIG. 1 is a diagrammatic representation of an ultrashort laser source, according to the invention.
Figure 2:
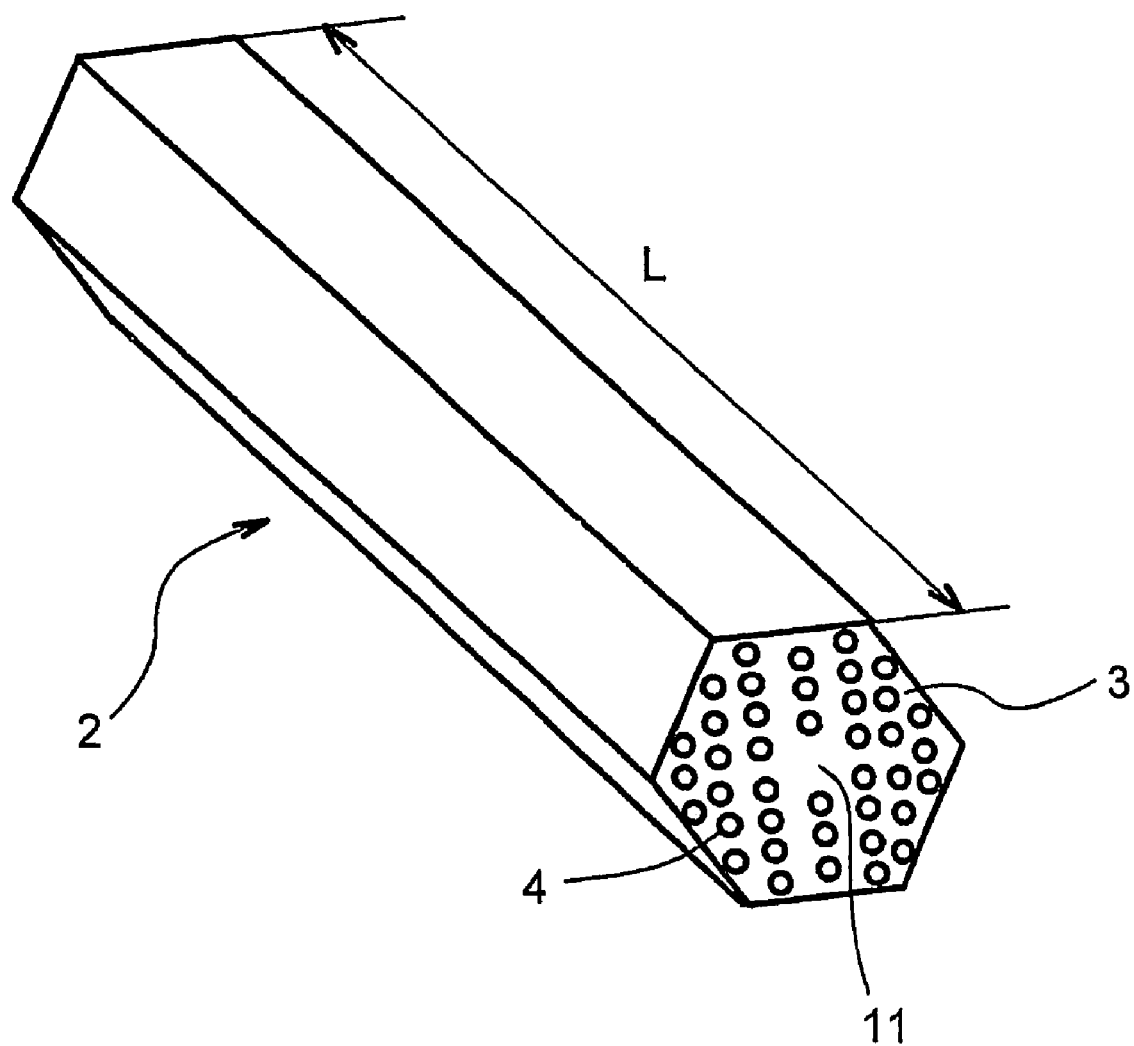
FIG. 2 is a diagrammatic representation of a photonic crystal fibre wherein is injected the luminous flux emitted by the primary laser source, according to the invention.

The purpose of the invention is a controlled spectral widening of a luminous flux generated by a laser source, obtained by optimisation of the experimental parameters (power of the laser source, core diameter of the fibre, length of the fibre), so that the phase self-modulation is mainly responsible for the spectral widening, and not the other physical processes also noted in the generation of supercontinuum (stimulated Raman emission, parametric amplification, 4-wave mixture, etc.).

The wide spectrum ultrashort laser source of the invention associates a laser source 1 using rare earth ions with an optical photonic crystal fibre 2. This photonic crystal fibre 2 is a fibre 3 advantageously of siliciuin having a periodic grid of cavities 4 conferring particular optical properties thereto. It is thus possible to widen the spectrum of a luminous flux introduced therein quite significantly. Such widening, according to the invention, is more than 50%, and preferably more than 80%, to the phase self-modulation. A set of wavelength filters 5 then enables if necessary to select a particular emission wavelength. The ultrashort laser source includes a primary source 6. By primary source source is meant an ultrashort laser source with rare earth ions. This primary source 6 emits a primary luminous flux 7 centred on a wavelength $\lambda_L$ of spectral width $\Delta\lambda_L$. $\lambda_L$ ranges typically between 1000 and 1100 nm and $\Delta\lambda_L$ is typically of the order of a new nm. The primary source 6 includes an active material pumped by a pump laser source 8. This pump laser source 8 is a solid laser emitting a luminous pump flux 9 centred on a wavelength $\lambda_D$. In a preferred embodiment, the pump laser source 8 is a junction laser. The wavelength $\lambda_D$ whereon is centred the luminous pump flux 9 ranges typically between 800 nm and 1 μm. The rare earth ions used in the active material of the primary source are selected among one of the following materials: Ytterbium (Yb), Neodymium (Nd) or any equivalent material.

The ultrashort laser source also comprises injection optics 10 sending the primary luminous flux 7 centred on a wavelength $\lambda_L$ and emitted by the laser primary source 6 in a photonic crystal fibre 2. For non limiting exemplification purposes, these injection optics 10 include at least one lens. The photonic crystal fibre 2 has a length L and a section d, preferably, the length L of the photonic crystal fibre 2 is $5 \leq L \leq 40$ cm. The photonic crystal fibre 2 comprises a periodic grid of cavities 4 of diameter $\Phi$ which are holes filled with air running through the whole length L of said fibre 2. Advantageously, the core of the photonic crystal fibre 2 does not include any additional cavities 11. In a preferred embodiment, the photonic crystal fibre 2 is made of silicium. In another embodiment, the material forming the photonic crystal fibre 2 is glass or any other equivalent material. In an embodiment, the geometry and the diameter of these cavities 4 as well as the length and the section d of the photonic crystal fibre 2 are selected so that the fibre 2 shows a dispersion in absolute value smaller than the dispersion of a homogenous optic fibre of the same material and of length L for the wavelength $\lambda_L$. In the case of silicium, for example, the dispersion is in absolute value smaller than 40 ps/km/nm at a wavelength $\lambda_L$=1025 nxn. Preferably, the geometry and the diameter of the cavities 4 as well as the length and the section d of the photonic crystal fibre 2 are selected so that the fibre 2 shows zero dispersion for the wavelength $\lambda_L$. It is then possible to obtain an extremely great spectral widening of the primary luminous flux 7. This widening remains very significant even for a primary luminous flux 7 exhibiting limited peak power. Advantageously, the power density of the primary luminous flux 7 is smaller than 600 Gigawatts/cm².

At the output of the photonic crystal fibre 2, the spectral width $\Delta\lambda_F$ of the luminous flux 12 ranges between 10 and 400 nm. It extends therefore maximum between 900 and 1300 nm and typically between 950 and 1150 nm. This spectral widening is centred on a wavelength $\lambda_F$ and a location on either side of the wavelength $\lambda_L$.

Figure 3:
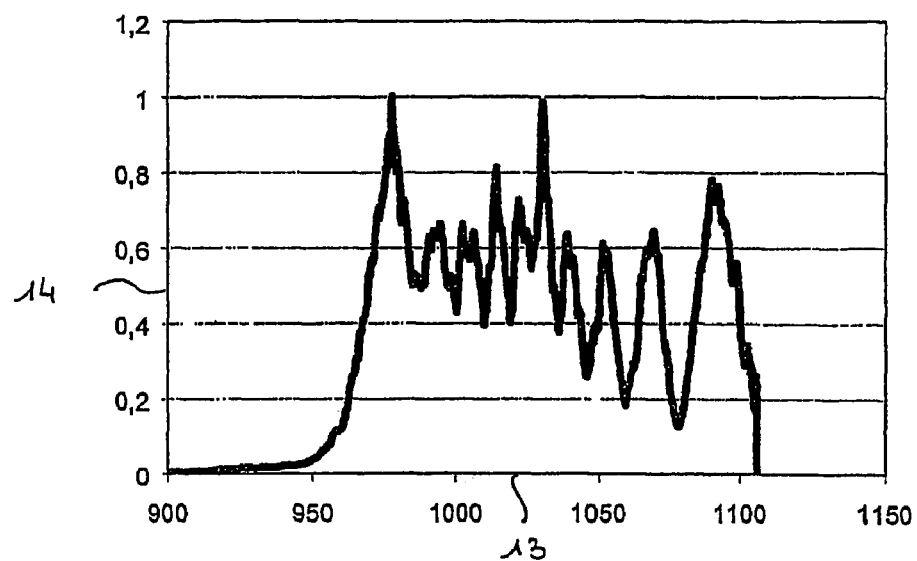
FIG. 3 shows the spectral distribution of the intensity of a luminous beam at the output of a photonic crystal fibre for a peak power of the primary luminous flux of 80 kW, according to an embodiment of the invention.

FIG. 3 shows the spectral distribution of the intensity at the output of a photonic crystal fibre 2 for a peak power of the primary luminous flux 7 equal to 80 kW. The photonic crystal fibre 2 is 10 cm long and has a core of diameter $\phi$=5.5 μm. The axis of abscisses 13 represents the wavelength, in nanometres (nm), and the axis of ordinates 14 the intensity, in arbitrary units, of the luminous flux 12 at the output of the photonic crystal fibre 2. The spectral support of the widened spectrum is perfectly delineated between 950 nm and approximately 1110 nm. This intensity spectral distribution exhibits amplitude modulations having an average period τ. By "average period" is meant the average of the periods of the amplitude modulations observed in the spectrum.

Coupling optics 15 are placed at the output of the fibre 2 with photonic crystals in order to collect the luminous flux 12. This luminous flux 12 is centred on a wavelength $\lambda_F$ and has a spectral width $\Delta\lambda_F$. Advantageously, the ultrashort laser source includes a wavelength selection device 5. At the output of this selection device 5, the luminous flux emitted by the laser source is centred on a wavelength $\lambda_s$ and has a spectral width $\Delta\lambda_s$. The pass-band of each filter used is advantageously adapted to the average period $\tau$ of the modulations of the spectrum of width $\Delta\lambda_F$ of the luminous flux 12 (FIG. 3).

In a preferred embodiment, the wavelength selection device 5 comprises a grid of interferential filters. The wavelength tunability is for instance obtained by rotation of the interferential filter, in order to modify the angle of incidence of the wide spectrum beam 12 on the filter. It is possible, in particular, to optimise the widening conditions in order to adjust the maxima of the spectrum of FIG. 3, so that they match the maximum transmission wavelengths of the filters.

A theoretical approach has been developed in order to explain the spectral widening observed of the primary luminous flux 7 injected into the photonic crystal fibre 2. According to this theory, the cavities 4 form a periodic grid of defects creating a forbidden photonic band in the fibre 2. Electromagnetic modes having frequencies comprised in said forbidden band may then propagate along these defects. The length of the photonic crystal fibre is sufficiently short and the power density of the primary luminous flux 7 injected into the photonic crystal fibre 2 is such that the non-linear effects are mainly due to the phase self-modulation. These non-linear effects accumulate throughout the propagation of said primary luminous flux 7 to lead to a spectral widening. The other physical processes generally observed in the generation of the supercontinuum such as the stimulated Raman emission, the parametric amplification, the four-wave mixture and the optical shock wave contribute only marginally to the spectral widening.

In the case of a widening solely related to the phase self-modulation, the phase of an ultrashort luminous pulse propagating in a non-linear medium such as an optic fibre depends on the intensity by the relation:

$$\Delta\Phi(t) = \frac{2\pi}{\lambda} n_2 I(t) L$$

where $\lambda$ is the wavelength of the pulse, $n_2$ the non-linear index of the propagation medium, $I(t)$ the luminous intensity at the instant $t$, and $L$ the length of the material traversed.

The associated frequency variation is then given by:

$$\Delta\omega(t) = -\omega_0 \frac{n_2 L}{c} \frac{dI(t)}{dt}$$

and the spectrum of the corresponding pulse is then given by the Fourier transform as the function $A(v)$:

$$\Delta\omega(v) = TF[A(v)]$$

Figure 4:
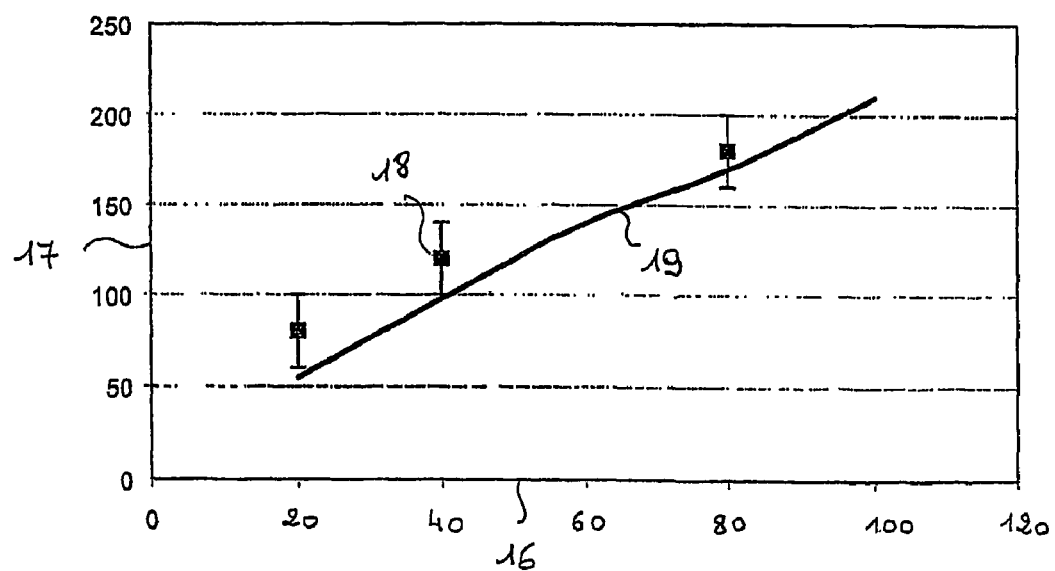
FIG. 4 represents the spectral width $\Delta\lambda_F$ of a luminous flux at the output of a photonic crystal fibre relative to the peak power of an incident primary luminous flux, in an embodiment of the invention.

In an embodiment, FIG. 4 shows the width of the spectrum relative to the peak power of the primary luminous flux for a photonic crystal fibre 2 of length 10 cm and having a core of diameter $\phi=5.5$ µm. The axis of ordinates 17 represents the spectral width $\Delta\lambda_F$, in nm, of the luminous flux 12 at the output of the photonic crystal fibre 2 and the axis of abscisses 16 represents the incident power, in kWatt, of the primary luminous flux 7 injected into said fibre. The measuring points 18 correspond to experimental measurements carried out for given peak power values of the primary luminous flux 7. The uncertainties on the measured value of the spectral width $\Delta\lambda_F$ have been plotted on Figure by error bars. The profile 19 (full line) is the result of a modelling of the widening solely related to the phase self-modulation and whereof the model has been described above. As an example and within the uncertainty values, for an incident peak power of 80 kW, the value of the measuring point is greater by approximately 10% than the value of the spectral widening obtained by the model describing the phase self-modulation.

The invention also concerns a sample measuring device by multiphotonic confocal microscopy. The arrangement comprises a microscope including a lens and an ultrashort laser source, emitting an energization luminous flux centred on a wavelength $\lambda_s$ and of spectral width $\Delta\lambda_s$. This ultrashort laser source comprises a laser primary source 6 with rare earth ions receiving a luminous pump flux 9 emitted by a solid laser pump source 8. This primary source 6 includes an active material and emits a primary luminous flux 7 centred on a wavelength $\lambda_L$ of spectral width $\Delta\lambda_L$. Injection optics 10 send the primary luminous flux 7 emitted by the primary source 6 into a photonic crystal fibre 2 and coupling optics 15 collect the luminous flux 12 at the output of this photonic crystal fibre 2. In a preferred embodiment, the spectrum is subjected inside the photonic crystal fibre 2 to a widening of more than 50% of the phase self-modulation. The contribution to the spectral widening of the phase self-modulation is preferably greater than 80%.

Means capable of directing said energization luminous flux send said flux to a sample through the microscope. Advantageously, the sample is placed in the focal plane of the lens. The interaction of the energization luminous flux with the sample to be analysed creates an analysis confocal volume. Means ensure the detection of the intensity of the luminous flux produced by the interaction of the energization luminous flux centred on the wavelength $\lambda_s$ with the sample and collected by the microscope. These means comprise advantageously CCD sensors or photomultipliers. Means of processing enable to analyse the signal produced by the means of detection.

Associated with the spatial resolution of the confocal microscope, the use of ultrashort duration luminous flux enables, according to an embodiment, to study cellular chemical phenomena in vivo. The luminous flux detected is in an embodiment a luminescent flux produced by the interesting particles in the confocal volume. This luminescent flux results from the fluorescence generated by the absorption caused by the interesting particles of at least two photons. Its density is significant only in the extremely reduced spatial extension analysis confocal volume. The possible deterioration of the sample is thereby limited.

Moreover, the sample measuring device using multiphotonic confocal microscopy exhibits the following advantages or may advantageously be implemented in the following cases:

1) Wavelength Range Available

Implementing a laser source that is tunable in the 1000–1200 nm range provides interesting advantages in the field of the multi-photon microscopy. To optimise the efficiency of the imaging process, the largest number of photons derived from the laser source should be coupled at cellular level. Two phenomena contribute to the degradation in efficiency of such coupling. Namely, the diffusion in the biological tissue, significant at short wavelengths, and the absorption of water, significant at wavelengths greater than 1300 nm.

The wavelength range of the tunable laser source corresponds to a compromise which maximises the coupling efficiency.

2) Multi-Wavelength Simultaneous Measurement

The laser sources used traditionally in multiphotonic microscopy are sources tunable over the 750–1000 nm range. These sources cannot transmit several wavelengths simultaneously, the fluorescence measurement on different fluorochromes, whereof the energization spectral domain is different, can only be sequential. Consequently, a first measurement must be performed at a wavelength $\lambda_1$, then the emission wavelength of the laser should be modified in order to conduct a second measurement at a wavelength $\lambda_2$, and so on and so forth. By "fluorochrome" is meant any molecule liable to be energized at a given wavelength $\lambda_i$ and to emit a luminous flux centred on a wavelength $\lambda_j$.

The sample measuring device using multiphotonic confocal microscopy enables advantageously simultaneous fluorescence measurement of different fluorochromes whereof the energization spectrum is different.

3) Possible Usage of New Fluorochromes

The laser source also enables to energize the fluorescence of fluorochromes emitting in the red portion of the visible spectrum, possibly the near-infrared. The energization spectrum of these fluorochromes is not compatible with the traditional sources.

4) Improvement of the Noise Produced by Self-Fluorescence

Measuring the fluorescence emitted by the fluorochromes is often made difficult by the presence of other naturally fluorescent species in the biological tissue. This spurious fluorescence, also called self-fluorescence, reduces considerably the signal/noise ratio of the measurement.

The table below specifies the main sources of self-fluorescence, as well as the associated energization wavelengths (Biophotonics International 8; N° 7 (2001) p 42).

| Source of self-fluorescence | Energization wavelength (nm) |
| --- | --- |
| Flavins | 380–490 |
| NADH and NADPH | 360–390 |
| Lipofuscins | 360–490 |
| AGE | 320–370 |
| Elastin and collagen | 440–480 |
| Lignin | 488 |
| Chlorophyll | 488 |

An energization wavelength greater than 1000 nm does not enable any energization caused by two-photon absorption at a wavelength smaller than 500 nm. The self-fluorescent species cannot therefore be energized by the laser source, object of the invention. The signal/noise ratio between the fluorescence of the fluorochrome and the noise generated by self-fluorescence is vastly improved, as well as the contrast of the images realised by means of the microscope.

5) Possibility of FRET Measurements

The fluorescence resonance energy transfer (FRET) measurements implement fluorescence energy transfer between a fluorochrome donor and a receiver. A laser source energizes the fluorescence of the donor, and the fluorescence of the donor energizes that of the receiver.

The absorption and emission spectra of the donor and of the receiver frequently overlap one another. The sample measuring device using multiphotonic confocal microscopy enables simultaneous energization of the donor and of the receiver for calibration and control purposes.

6) Usage in Multiphotonic Microscopy

The usage of the sample measuring device using multiphotonic confocal microscopy enables to energise numerous fluorochromes by three-photon absorption, and not by two-photon absorption. The confocal volume wherein the fluorescence may take place is substantially smaller in the case of the three-photon absorption, compared with the case of the two-photon absorption. The spatial resolution of the measurement is thus vastly improved.

The invention claimed is:

1. A wide spectrum compact ultrashort laser source including:
    a laser primary source (6) with rare earth ions receiving a luminous pump flux (9) centered on a wavelength $\lambda_D$, said flux (9) being emitted by a solid laser pump source (8), said primary source (6) including an active material and emitting a primary luminous flux (7) centered on a wavelength $\lambda_L$ of spectral width $\Delta\lambda_L$,
    a photonic crystal fiber (2) having a length L, a section d, and a set of cavities (4) of diameter $\phi$,
    injection optics (10) sending the primary luminous flux (7) emitted by the primary source (6) into the photonic crystal fiber (2),
    coupling optics (15) collecting the luminous flux (12) at the output of the photonic crystal fiber (2), said flux (12) being centered on a wavelength $\lambda_F$ and of spectral width $\Delta\lambda_F$,
    characterized in that the spectrum is subjected inside the photonic crystal fiber (2) to a widening of more than 50% of the phase self-modulation.

2. A wide spectrum ultrashort laser source according to claim 1, characterized in that the contribution to the widening of the spectrum of the phase self-modulation is preferably greater than 80%.

3. A wide spectrum ultrashort laser source according to claim 1, characterized in that the length L of the photonic crystal fiber (2) is $5 \leq L \leq 40$ cm and the power density of the primary luminous flux (7) incident is smaller than 600 Gigawatts/cm².

4. A wide spectrum ultrashort laser source according to claim 1, characterized in that it includes a wavelength selection device.

5. A wide spectrum ultrashort laser source according to claim 4, characterized in that the wavelength selection device comprises a grid of interferential filters.

6. A wide spectrum ultrashort laser source according to claim 5, characterized in that said flux (12) of spectral width $\Delta\lambda_F$ exhibits amplitude modulations of average period $\tau$ and that the pass-band of each filter is adapted to this average period $\tau$.

7. A wide spectrum ultrashort laser source according to claim 1, characterized in that the solid laser pump source (8) is a junction laser.

8. A wide spectrum ultrashort laser source according to claim 1, characterized in that the active material comprises ytterbium ions.

9. A wide spectrum ultrashort laser source according to claim 1, characterized in that the active material comprises neodymium ions.

10. A wide spectrum ultrashort laser source according to claim 1, characterized in that the spectral width $\Delta\lambda_F$ ranges between 10 and 400 nm.

11. A wide spectrum ultrashort laser source according to claim 1, characterized in that the diameter $\phi$ of the cavities (4), the length L and the section d of the photonic crystal fiber (2), the spacing between the cavities (4) are selected so that the dispersion of the primary luminous flux (7) centered on the wavelength $\lambda_L$ in said photonic crystal fiber (2) is in absolute value smaller than the dispersion of a homogeneous optic fiber of the same material and of length L for the wavelength $\lambda_L$.

12. A wide spectrum ultrashort laser source according to claim 11, characterized in that the dispersion of the primary luminous flux (7) centered on the wavelength $\lambda_L$ in the photonic crystal fiber (2) is nil.

13. A sample measuring device using multiphotonic confocal microscopy comprising:
- a confocal microscope including a lens,
- a light source emitting a luminous flux,
- means capable of directing said luminous flux to a sample through the microscope,
- means for detecting the intensity of the luminous flux produced by the interaction of the luminous beam emitted by the light source on the sample and collected by the microscope,
- means for processing the signal produced by the means of detection, characterized in that the light source comprises:
- a laser primary source (6) with rare earth ions receiving a luminous pump flux (9) centered on a wavelength $\lambda_D$, said flux (9) being emitted by a solid laser pump source (8), said primary source (6) including an active material and emitting a primary luminous flux (7) centered on a wavelength $\lambda_L$ of spectral width $\Delta\lambda_L$,
- a photonic crystal fiber (2) having a length L, a section d, and a set of cavities (4) of diameter $\phi$,
- injection optics (10) sending the primary luminous flux (7) emitted by the primary source (6) in the photonic crystal fiber (2),
- coupling optics (15) collecting the luminous flux (12) at the output of the photonic crystal fiber (2), said flux (2) being centered on a wavelength $\lambda_F$ and of spectral width $\Delta_F$, and in that the spectrum is subjected inside the photonic crystal fiber (2) to a widening of more than 50% of the phase self-modulation.

14. A sample measuring device using multiphotonic confocal microscopy according to claim 13, characterized in that the contribution to the widening of the spectrum of the phase self-modulation is preferably greater than 80%.

15. A sample measuring device using multiphotonic confocal microscopy according to claim 13, characterized in that the length L of the photonic crystal fiber (2) is $5 \leq L \leq 40$ cm and the power density of the incident primary luminous flux (7) is smaller than 600 Gigawatts/cm$^2$.

16. A sample measuring device using multiphotonic confocal microscopy according to claim 14, characterized in that the length L of the photonic crystal fibre (2) is $5 \leq L \leq 40$ cm and the power density of the incident primary luminous flux (7) is smaller than 600 Gigawatts/cm$^2$.

* * * * *

UNITED STATES PATENT AND TRADEMARK OFFICE
CERTIFICATE OF CORRECTION

| | | |
|---|---|---|
| PATENT NO. | : 7,110,111 B2 | |
| APPLICATION NO. | : 10/484886 | |
| DATED | : September 19, 2006 | |
| INVENTOR(S) | : Eric Mottay | |

It is certified that error appears in the above-identified patent and that said Letters Patent is hereby corrected as shown below:

On the title page, amend Item (22) to read as follows:

--(22) PCT Filed:    Jul. 26, 2002--.

Signed and Sealed this

Nineteenth Day of December, 2006

JON W. DUDAS
*Director of the United States Patent and Trademark Office*